Patented Nov. 19, 1940

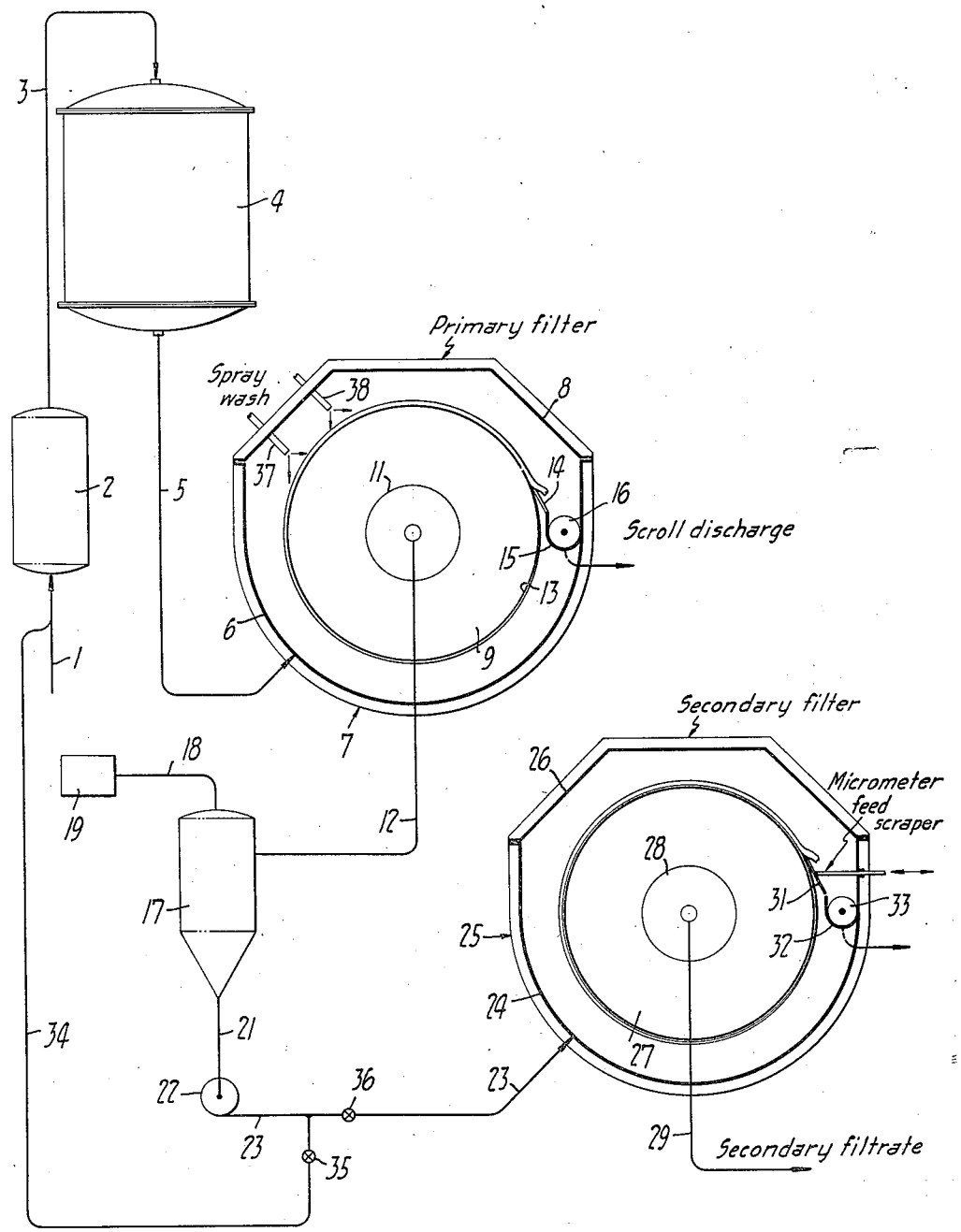

2,221,993

UNITED STATES PATENT OFFICE 2,221,993

FILTER

Harold F. Oswald, Elizabeth, N. J., assignor to Oliver United Filters Incorporated, San Francisco, Calif., a corporation of Nevada Application February 13, 1939, Serial No. 256,041

3 Claims. (Cl. 210—201)

This invention relates in general to industrial filters and in particular to filters designed for the filtration of colloidal-like materials such as for example paraffine wax from lubricating oils, in order to lower the pour test of the oil.

The separation of wax from wax-bearing lubricating oils has proved to be a very difficult problem. The first approach to the problem was to chill the oil and then pass it through pressure filters by means of rather high pressures. This operation however was of necessity a batch operation, for the wax content of the oil soon plugged or blinded the filter medium. An attempt was then made to effect a continuous separation of the wax on a continuous rotary drum filter by resorting to the use of a filter aid such as diatomaceous earth. The filter aid was added either before or after the chilling operation and then after the filtration operation the filter aid had to be recovered for further use, for otherwise the cost of the filter aid would have made this process uneconomical. Within recent years the so-called "filter aid process" has been replaced by the use of special or selective solvents such as acetone, benzol, butane, and propane. In the use of selective solvents the wax-bearing oil is treated with the desired solvent or solvents, chilled just as in the case of the earlier processes, and then subjected to continuous filtration, preferably in the absence of a filter aid.

In each of these processes the filter is the bottle neck of the process, for regardless of the use of filter aids and selective solvents, the wax, being of a colloidal nature, plugs the filter medium and consequently retards and finally prevents further filtration. For the purpose of sustaining the rate of filtration and obtaining a clear filtrate, very closely and tightly woven filter mediums have been used. This has been done on the theory that the smaller the interstices of the filter medium the less the chances of having individual wax particles pass through its surface with the filtrate and the less the chances of the wax particles becoming lodged within its interstices.

Experience, however, has shown that regardless of how closely or tightly woven the filter medium may be, plugging still results and the rate of filtration soon falls below the economical limit. When the cover has become blinded it is necessary to subject it to a hot solvent wash for the purpose of dissolving the wax lodged within the interstices of the cover. The wax solution passes through the cover as filtrate and must be re-run through the process in order to remove its wax content.

As a result of considerable thought and experimental work I have found that far better results can be obtained by the use of a filter medium having interstices of such dimensions that although individual wax particles can readily pass through them, they are immediately bridged by a group of such particles. These bridging particles then serve as the actual filter medium, while the filter fabric functions merely as a support and drainage member for the initial layer of wax particles. The use of a cover of this character results, not only in a relatively long sustained rate of initial filtration but furthermore, since the wax particles are not tightly embedded within the interstices of the cover, the wax cake deposited and supported thereby can be discharged far more readily and the cover may be washed far more effectively when this finally becomes necessary. However, a medium of this character is more subject to tears and breaks than is a tightly woven cover, and therefore I have found it desirable to pass the resulting filtrate through a second filter preferably of the precoat type such as disclosed in the Wieneke U. S. Patent No. 2,083,887 of June 15, 1937, in order to insure that no wax-bearing oil will pass to a subsequent step in the process.

In general, therefore, the object of this invention is the provision, in a filter designed for the filtration of particles of a colloidal nature such as wax, of a cover or supporting and drainage member having a mesh or openings of such dimensions as will permit the passage therethrough of single members of such particles but which will be bridged by a group of such particles.

A further object of the invention is the provision of a method for the filtration of a pulp or slurry of a colloidal nature wherein the pulp or slurry is first passed through a filter provided with a filter medium or cover having relatively large interstices and then the filtrate from this filter is passed through a precoat filter.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing the single figure shown discloses a flow diagram embodying the objects of my invention with particular reference to the dewaxing of lubricating oils.

As shown in this diagram the wax-bearing oil and solvent are introduced through a line 1 into a chiller 2 wherein the wax content is crystallized. The chilled wax and solvent then pass through the line 3 into a storage tank 4 and from this storage tank through a line 5 to the tank 6 of a filter generally designated as 7. Sealed to the upper edges of the tank 6 is a cover 8, and the entire filter is insulated so as to prevent the transfer of heat from its exterior to its interior. Rotatably disposed within the tank 6 is a rotary drum 9, the periphery of which is provided with a plurality of contiguous filtrate compartments, each adapted to successively communicate through an automatic valve 11 with a filtrate line 12. The periphery of the drum 9 is covered with a loosely woven filter medium 13 which will be described in fuller detail hereafter. Mounted adjacent the right hand side of the drum 9 is a doctor or scraper 14 for discharging the wax cake deposited on the drum during the process of filtration. The cake discharged by the scraper 14 falls into a longitudinally extending trough 15 within which is mounted a scroll 16 for conveying the wax cake through an opening formed in a wall of the tank 6.

The filtrate from the filter 7, which for purposes of identification may be referred to as the primary filter, passes through the line 12 into a vacuum receiver 17, the upper end of which communicates through a line 18 with a vacuum pump 19. From the vacuum receiver 17 the filtrate passes through a line 21, a pump 22, and a line 23 to the tank 24 of a secondary continuous rotary drum filter generally designated as 25. The secondary filter 25, as in the case of the primary filter, is provided with a hood 26 and is insulated against the transfer of heat. Preferably the filter 25 is of the precoat type as disclosed in the U. S. Patent to Wieneke No. 2,083,887 of June 15, 1937, although the peripheral surface of its drum 27 may be sectionalized as in the case of the primary filter. During the rotation of the drum each of its sections or filtrate compartments successively communicates through a valve 28 with a filtrate line 29 which in turn communicates with a suitable source of vacuum such as a vacuum receiver (not shown). Formed on the periphery of the drum is a layer or precoat of filter aid material such as diatomaceous earth, on which the wax cake is deposited due to the filtration operation. The wax cake so deposited, together with the outer film of the precoat, is continuously or intermittently shaved off by a movable scraper 31 designed to operate in accordance with either the Wieneke patent above referred to or any equivalent construction. Secured to the tank 24 beneath the scraper 31 is a trough 32 adapted to accommodate a scroll 33 by which the wax cake and precoat material are conveyed through a wall of the tank.

Communicating with the line 23 extending beneath the pump 22 and the filter tank 24 of the secondary filter is a line 34 leading preferably through a mix tank (not shown) into the feed line 1. Inserted in the line 34 is a normally closed valve 35, and inserted in the line 23 is a normally open valve 36. When it becomes necessary to renovate or wash the cover 13 of the primary filter, the valve 35 is opened and the valve 36 is closed so that the wax-bearing filtrate resulting from the washing operation may be made to pass through the receiver 17, line 21, pump 22, valve 35, and line 34 to the feed line 1.

For the purpose of washing the cake deposited on the cover 13, the hood 8 is provided with a set of spray nozzles 37 and 38. Obviously these spray nozzles may also be used for washing or renovating the cover when it has become plugged or blinded.

Referring now to the loosely woven filter medium 13 with which the drum 9 of the primary filter is covered in accordance with my invention:

As previously stated, it has been customary in the past to use a dense and closely woven cloth filter medium, on the theory that material of this character precluded any possibility of the passage of any trace of solid wax through its mesh, thereby assuring a finished dewaxed oil having a pour test corresponding to the temperature at which filtration is effected. In a duck weave the filling thread passes one warp on the top side and one warp on the bottom side and because of this design gives an even square or oblong opening between its threads. This density may be varied widely by the size of the threads used and the force with which they are driven together to close the openings. It is therefore apparent that a loosely woven duck varies materially from chain and twill weaves and from driven ducks, which have ordinarily been used in the past for dewaxing purposes. By actual experiment it has been found that when filtering a Mid-Continent solvent refined and solvent diluted stock chilled to approximately −10° F. on a 14½ ounce per square yard chain woven cloth, the rate of filtration falls off in accordance with the following schedule:

Rate at end of hour designated, in gallons per square foot per hour:
    First hour _____ 16.25
    Second hour _____ 13.25
    Third hour _____ 13.00
    Fourth hour _____ 12.75
    Fifteenth hour _____ 10.50
    Twentieth hour _____ 9.75

It is apparent from this schedule that the time soon arrives when it is necessary to cease filtering and to renovate the filter medium by dissolving the wax from the mesh of the cloth with a solvent at a temperature higher than the wax melting point. This washing operation requires from one to three hours time, during which the filter is out of production. In other tests wherein 14½ ounce chain woven cloth was again used, I found that although the initial rate of filtration was considerably higher than normally encountered, it was necessary to renovate or wash at the end of twenty minutes of operation. However, by substituting a loosely woven duck for the chain woven cloth I found that the initial rate of filtration of the same oil filtered under identical conditions would be sustained for an indefinite period. For this purpose I used and prefer to use in connection with the present invention a 10½ ounce per square yard hose duck fabric in which there are fifty warp threads and sixteen filling threads per square inch. The warp threads should be two-ply, No. 12½ cotton and the filling threads three-ply, No. 8 cotton. It is obvious that slight variations in the weave and weights described are permissible, within the range of weights up to 12.6 ounces.

By substituting a hose duck fabric of this nature for the closely woven fabrics previously used, it is possible to sustain the initial rate of filtration over a long period of time and at the same time produce a substantially wax-free filtrate. Furthermore, a loosely woven fabric of this character may be far more readily washed or renovated than the fabrics previously used when it finally becomes necessary to shut the filter down. Although a substantially wax-free filtrate is produced, it is desirable, as above described, to pass the filtrate from the primary filter through a secondary filter so that in the event the hose duck cover for any reason fails, wax-bearing oil will not be passed to a further step in the process.

I claim:

1. A process for dewaxing oils comprising: chilling a wax-bearing oil to congeal its wax content; passing the oil so chilled through a loosely woven filter cloth to produce a primary filtrate; and then filtering said primary filtrate through a body of comminuted filtering material to produce a brilliant secondary filtrate.

2. A process for dewaxing oils comprising: chilling a wax-bearing oil to congeal its wax content; passing the oil so chilled through a loosely woven hose duck filter cloth to produce a primary filtrate; and then filtering said primary filtrate through a body of comminuted filtering material to produce a brilliant secondary filtrate.

3. A process for dewaxing oils comprising: chilling a wax-bearing oil to congeal its wax content; filtering the oil so chilled on a continuous filter provided with a loosely woven hose duck filter medium to produce a primary filtrate; filtering said primary filtrate on a continuous filter having a filter medium of comminuted material to produce a brilliant secondary filtrate; and continuously shaving off the wax cake formed on the surface of said comminuted material together with a thin film of said material continuously to provide a fresh filtering surface.

HAROLD F. OSWALD.